(12) United States Patent
You

(10) Patent No.: US 12,093,492 B2
(45) Date of Patent: Sep. 17, 2024

(54) DISPLAY DEVICE

(71) Applicant: Samsung Display Co., Ltd., Yongin-si (KR)

(72) Inventor: Chungi You, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/352,137

(22) Filed: Jul. 13, 2023

(65) Prior Publication Data

US 2024/0118775 A1    Apr. 11, 2024

(30) Foreign Application Priority Data

Oct. 11, 2022    (KR) ........................ 10-2022-0130021

(51) Int. Cl.
*G06F 3/044*    (2006.01)
*G06F 3/041*    (2006.01)

(52) U.S. Cl.
CPC .......... *G06F 3/0445* (2019.05); *G06F 3/0412* (2013.01); *G06F 3/04164* (2019.05); *G06F 3/0446* (2019.05)

(58) Field of Classification Search
CPC .... G06F 3/0412; G06F 3/0445; G06F 3/0446; G06F 3/04164; G06F 3/0443; G06F 2203/04111
See application file for complete search history.

(56) References Cited

U.S. PATENT DOCUMENTS

| | | | |
|---|---|---|---|
| 9,916,057 B2* | 3/2018 | Park ...................... | G06F 3/0446 |
| 10,698,513 B2* | 6/2020 | Na ........................ | H10K 50/805 |
| 11,163,397 B2* | 11/2021 | Yang ..................... | G06F 1/1643 |
| 11,216,139 B2 | 1/2022 | Lee et al. | |
| 11,243,645 B2* | 2/2022 | Kim ..................... | H10K 50/844 |
| 11,360,621 B2* | 6/2022 | Kim ...................... | H10K 59/40 |
| 11,379,084 B2 | 7/2022 | You et al. | |
| 11,422,664 B2 | 8/2022 | Kim et al. | |
| 11,637,154 B2* | 4/2023 | Yang ..................... | H10K 50/841 |
| | | | 257/40 |
| 11,656,730 B2* | 5/2023 | Kim ...................... | G06F 3/0445 |
| | | | 345/174 |

(Continued)

FOREIGN PATENT DOCUMENTS

| | | |
|---|---|---|
| KR | 10-2020-0124807 A | 11/2020 |
| KR | 10-2021-0026451 A | 3/2021 |

(Continued)

*Primary Examiner* — Vinh T Lam
(74) *Attorney, Agent, or Firm* — Lewis Roca Rothgerber Christie LLP

(57) ABSTRACT

A display device including a display panel, and an input sensing panel on the display panel, the input sensing panel including an active region and an inactive region adjacent to the active region, the input sensing panel including a base substrate, a first conductive layer on the base substrate, the first conductive layer including a plurality of sensing parts, a connecting part electrically connected to the plurality of sensing parts, and a plurality of sensing patterns, a first sensing insulation layer in the active region and configured to cover the first conductive layer, a plurality of connecting lines in the inactive region and electrically connected to the first conductive layer, and barrier ribs in the inactive region and between the plurality of connecting lines.

20 Claims, 7 Drawing Sheets

(56) References Cited

U.S. PATENT DOCUMENTS

| | | | | |
|---|---|---|---|---|
| 11,675,468 B2* | 6/2023 | Lee | ................... | G06F 3/04164 |
| | | | | 345/173 |
| 11,720,213 B2* | 8/2023 | Kim | ................... | G06F 3/0412 |
| | | | | 345/174 |
| 11,782,550 B2* | 10/2023 | Cho | ................... | G06F 3/04162 |
| | | | | 345/173 |
| 11,829,568 B2* | 11/2023 | Wu | ................... | G06F 3/0443 |
| 11,847,275 B2* | 12/2023 | Park | ................... | H10K 59/40 |
| 11,880,522 B2* | 1/2024 | Zhang | ................... | H10K 59/40 |
| 11,910,672 B2* | 2/2024 | Bang | ................... | H10K 50/844 |
| 11,974,475 B2* | 4/2024 | Wei | ................... | G09F 9/33 |
| 11,974,487 B2* | 4/2024 | Jang | ................... | G06F 3/0443 |
| 2019/0179448 A1* | 6/2019 | Lim | ................... | G06F 3/0448 |
| 2020/0341591 A1 | 10/2020 | You et al. | | |
| 2022/0262866 A1* | 8/2022 | Kim | ................... | G06F 3/0412 |
| 2023/0397460 A1* | 12/2023 | Wang | ................... | G06F 3/0443 |
| 2024/0028167 A1* | 1/2024 | Qiao | ................... | H10K 59/40 |

FOREIGN PATENT DOCUMENTS

| | | |
|---|---|---|
| KR | 10-2021-0101376 A | 8/2021 |
| KR | 10-2021-0142036 A | 11/2021 |

* cited by examiner

DISPLAY DEVICE

CROSS-REFERENCE TO RELATED APPLICATIONS

This application claims priority to and the benefit of Korean Patent Application No. 10-2022-0130021 filed on Oct. 11, 2022, in the Korean Intellectual Property Office, the disclosure of which is incorporated by reference herein in its entirety.

BACKGROUND

1. Field

Aspects of embodiments of the present disclosure relate to a display device.

2. Description of the Related Art

In general, electronic devices, such as smart phones, digital cameras, notebook computers, car navigation units, smart televisions, and the like include display device for displaying images to users. The display device generates an image and provides the generated image to the user through a display screen.

The display device includes a display panel that generates an image and an input sensing panel that is disposed on the display panel and that senses an external input. The input sensing panel is disposed on the display panel and senses a touch of the user as an external input. The input sensing panel includes a plurality of sensing electrodes for sensing an external input and a plurality of connecting lines connected to the plurality of sensing electrodes. The plurality of sensing electrodes are disposed at an active region, and the plurality of connecting lines are disposed at an inactive region around the active region.

The above information disclosed in this Background section is only for enhancement of understanding of the invention, and therefore it may contain information that does not form the prior art that is already known to a person of ordinary skill in the art.

SUMMARY

Aspects of embodiments of the present disclosure provide a display device including an input sensing panel having improved (e.g., increased) product reliability.

According to some embodiments of the present disclosure, there is provided a display device including: a display panel; and an input sensing panel on the display panel, the input sensing panel including an active region and an inactive region adjacent to the active region, the input sensing panel including: a base substrate; a first conductive layer on the base substrate, the first conductive layer including a plurality of sensing parts, a connecting part electrically connected to the plurality of sensing parts, and a plurality of sensing patterns; a first sensing insulation layer in the active region and configured to cover the first conductive layer; a plurality of connecting lines in the inactive region and electrically connected to the first conductive layer; and barrier ribs in the inactive region and between the plurality of connecting lines.

In some embodiments, the first sensing insulation layer and the barrier ribs include the same material.

In some embodiments, the input sensing panel further includes a second conductive layer on the first sensing insulation layer and including a connecting pattern electrically connected to the plurality of sensing patterns.

In some embodiments, the first conductive layer includes conductive oxide, and the second conductive layer includes a metallic material.

In some embodiments, the input sensing panel further includes a second sensing insulation layer configured to cover the second conductive layer, the barrier ribs, and the plurality of connecting lines.

In some embodiments, the plurality of connecting lines extend in a first direction and are spaced apart from each other in a second direction crossing the first direction, and the barrier ribs extend in the first direction and are positioned to alternate with the plurality of connecting lines in the second direction.

In some embodiments, a thickness of a barrier rib of the barrier ribs is smaller than a thickness of a connecting line of the plurality of connecting lines.

In some embodiments, each of the plurality of connecting lines includes: a first layer including a first material; a second layer on the first layer and including a second material different from the first material; and a third layer on the second layer and including the first material.

In some embodiments, the second layer is thicker than the first layer and the third layer.

In some embodiments, the display panel includes: a substrate; a circuit element layer on the substrate; a display element layer on the circuit element layer; and an encapsulation substrate configured to cover the display element layer, the encapsulation substrate being the base substrate.

According to some embodiments of the present disclosure, there is provided a display device including: a base substrate; a plurality of sensing electrodes on the base substrate; a plurality of connecting lines electrically connected to the plurality of sensing electrodes; and barrier ribs between the plurality of connecting lines and arranged to alternate with the plurality of connecting lines, wherein the barrier ribs include an insulating material.

In some embodiments, the plurality of sensing electrodes include: a plurality of first sensing electrodes, each of which includes a plurality of sensing parts and a connecting part electrically connected to the plurality of sensing parts; and a plurality of second sensing electrodes, each of which includes a plurality of sensing patterns and a connecting pattern electrically connected to the plurality of sensing patterns.

In some embodiments, the plurality of first sensing electrodes and the plurality of sensing patterns are directly on the base substrate.

In some embodiments, the display device further includes: a first sensing insulation layer on the base substrate and configured to cover the plurality of first sensing electrodes and the plurality of sensing patterns.

In some embodiments, the first sensing insulation layer includes the same material as the barrier ribs.

In some embodiments, the connecting pattern is on the first sensing insulation layer.

In some embodiments, the display device further includes: a second sensing insulation layer configured to cover the connecting pattern, the barrier ribs, and the plurality of connecting lines.

In some embodiments, a thickness of the barrier ribs is smaller than a thickness of the plurality of connecting lines.

In some embodiments, each of the plurality of connecting lines includes: a first layer including a first material; a second layer on the first layer and including a second material different from the first material; and a third layer on the second layer and including the first material.

In some embodiments, the second layer is thicker than the first layer and the third layer.

It is to be understood that both the foregoing general description and the following detailed description are exemplary and explanatory and are intended to provide further explanation of the present disclosure, the scope of which is defined by claims and equivalents thereof.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
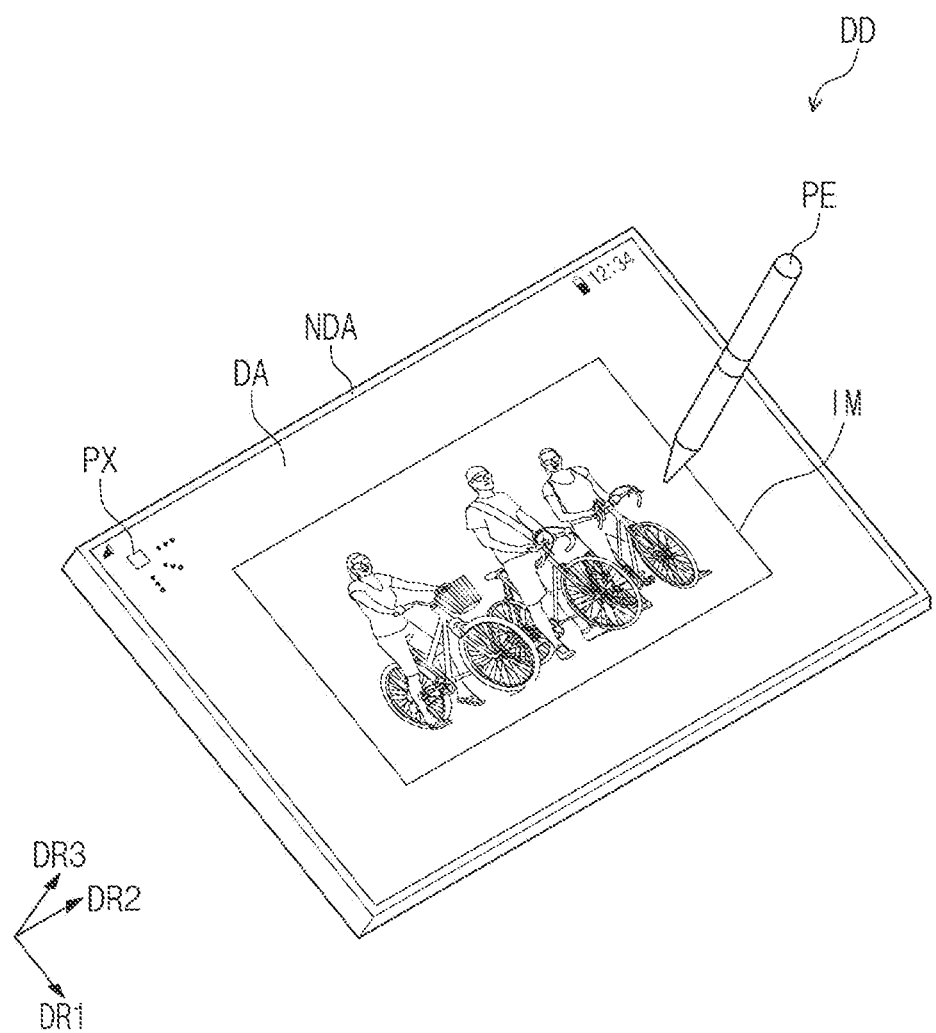
FIG. 1 is a perspective view of a display device according to some embodiments of the present disclosure.

The invention will now be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the present disclosure to those skilled in the art.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described with reference to the accompanying drawings.

FIG. 1 is a perspective view of a display device DD according to some embodiments of the present disclosure.

Referring to FIG. 1, the display device DD may be a device activated in response to an electrical signal. For example, the display device DD may be a medium or large-sized display device used in a tablet PC, a television, a monitor, a billboard, or an automobile. However, embodiments of the present disclosure are not limited thereto, and the display device DD may be a display device employed in, for example, a small or medium-sized electronic device such as a personal computer, a notebook computer, a personal digital terminal, a game machine, a portable electronic device, or a camera. However, these are merely illustrative, and the display device DD may be a display device employed for other display devices as long as the use does not deviate from the spirit and scope of the present disclosure. In FIG. 1, a tablet PC is illustrated as an example of the display device DD.

The display device DD may include a display region DA and a non-display region NDA defined therein. The display region DA is a region in which pixels PX are disposed and that substantially displays an image IM. The display region DA may include a plane defined by a first direction DR1 and a second direction DR2. Although FIG. 1 illustrates one example that the display region DA has a quadrilateral shape, the shape of the display region DA may be diversely modified depending on the shape of the display device DD.

The non-display region NDA may be a region on which the image IM is not displayed. In some embodiments of the present disclosure, the non-display region NDA may surround the display region DA. However, this is illustrative, and embodiments of the present disclosure are not limited thereto. The non-display region NDA may be disposed at (e.g., positioned/located at) only one side of the display region DA, or may be omitted.

A thickness direction of the display device DD may be parallel to a third direction DR3 crossing the first direction DR1 and the second direction DR2. Accordingly, front surfaces (e.g., upper surfaces) and rear surfaces (e.g., lower surfaces) of members constituting the display device DD may be defined based on the third direction DR3.

The display device DD may sense an input using a user's body (e.g., a finger OI; see, e.g., FIG. 2) or an input using an input device PE. The input using the user's body may include various forms of external inputs such as a touch, heat, or pressure using a part of the user's body. The input device PE may mean a device other than the user's body part. For example, the input device PE may be an active pen, a stylus pen, a touch pen, or an electronic pen. A further detailed description thereabout will be given with reference to FIG. 2.

Although the rigid display device DD is illustrated as an example in FIG. 1, embodiments of the present disclosure are not limited thereto. For example, the following descriptions may be applied to various electronic devices such as a foldable display device, a rollable display device, and a slidable display device.

Figure 2:
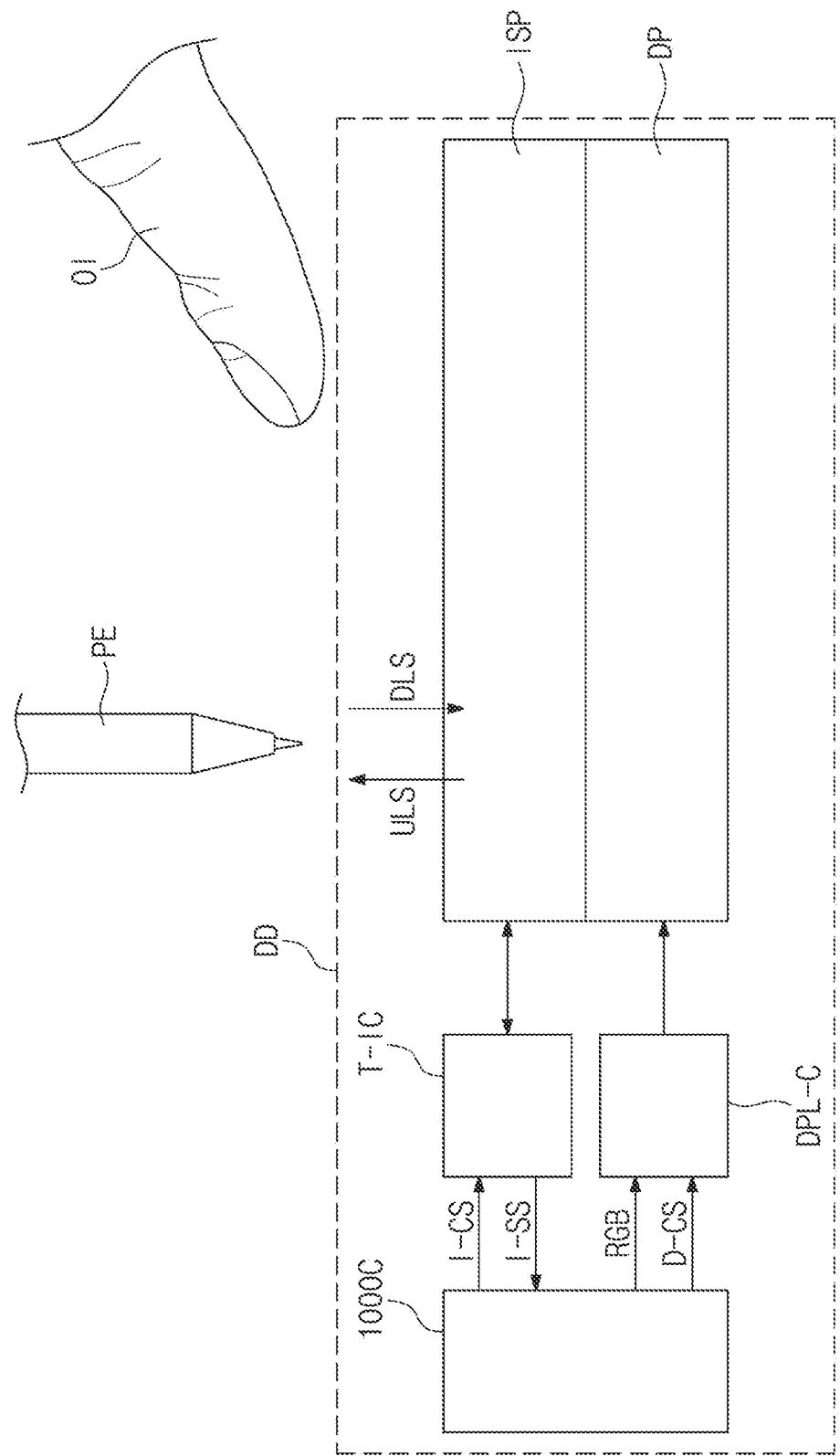
FIG. 2 illustrates an interaction between the display device and an input device according to some embodiments of the present disclosure.

FIG. 2 illustrates an interaction between the display device DD and the input device PE according to some embodiments of the present disclosure.

Referring to FIG. 2, the display device DD may sense both an active input by the input device PE and a passive input by a touch OI. The input device PE may be an input means of an active type that provides a drive signal. For example, the input device PE may be an active pen. The touch OI may include all input means, such as the user's body and a passive pen, which are capable of causing a change in capacitance.

The display device DD and the input device PE may perform two-way communication with each other. The display device DD may provide an uplink signal ULS to the input device PE, and the input device PE may provide a downlink signal DLS to the display device DD. For example, the uplink signal ULS may include information, such as panel information, protocol version, and/or the like, but is not particularly limited thereto. The downlink signal DLS may include a synchronization signal, state information of the input device PE, and/or the like. For example, the downlink signal DLS may include coordinate information of the input device PE, battery information of the input device PE, tilt information of the input device PE, and/or various pieces of information stored in the input device PE, but is not particularly limited thereto.

The display device DD may include a display panel DP, an input sensing panel ISP, a main driver 1000C, a display driver DPL-C, and a sensor driver T-IC.

The display panel DP may be a component that substantially generates an image. The display panel DP may be an emissive display panel. For example, the display panel DP may be an organic light emitting display panel, an inorganic light emitting display panel, an organic-inorganic light emitting display panel, a quantum-dot display panel, a micro-LED display panel, a nano-LED display panel, or the like.

The input sensing panel ISP may be disposed on (e.g., positioned/located or arranged on) the display panel DP. The input sensing panel ISP may sense an external input applied from the outside. The input sensing panel ISP may be an external sensor attached to the display panel DP, or may be an integrated sensor continuously formed during a manufacturing process of the display panel DP.

The main driver 1000C may control overall operation of the display device DD. For example, the main driver 1000C may control operations of the display driver DPL-C and the sensor driver T-IC. The main driver 1000C may include at least one microprocessor and may be referred to as a host. The main driver 1000C may further include a graphic controller.

The display driver DPL-C may drive the display panel DP. The display driver DPL-C may be a component including a driver IC, a scan driver, and a light emission driver. The display driver DPL-C may receive image data RGB and a control signal D-CS from the main driver 1000C. The control signal D-CS may include various signals. For example, the control signal D-CS may include an input vertical synchronization signal, an input horizontal synchronization signal, a main clock, a data enable signal, and the like. Based on the control signal D-CS, the display driver DPL-C may generate a vertical synchronization signal and a horizontal synchronization signal for controlling timing at which a signal is provided to the display panel DP.

The sensor driver T-IC may drive the input sensing panel ISP. The sensor driver T-IC may receive a control signal I-CS from the main driver 1000C. The control signal I-CS may include a mode determination signal for determining a driving mode of the sensor driver T-IC and a clock signal. Based on the control signal I-CS, the sensor driver T-IC may operate in a first mode for sensing an input by the touch OI or in a second mode for sensing an input by the input device PE.

The sensor driver T-IC may calculate coordinate information of a first input or a second input, based on a signal received from the input sensing panel ISP and may provide a coordinate signal I-SS having the coordinate information to the main driver 1000C. The main driver 1000C executes an operation corresponding to a user input, based on the coordinate signal I-SS. For example, the main driver 1000C may operate the display driver DPL-C such that a new application image is displayed on the display panel DP.

Figure 3:
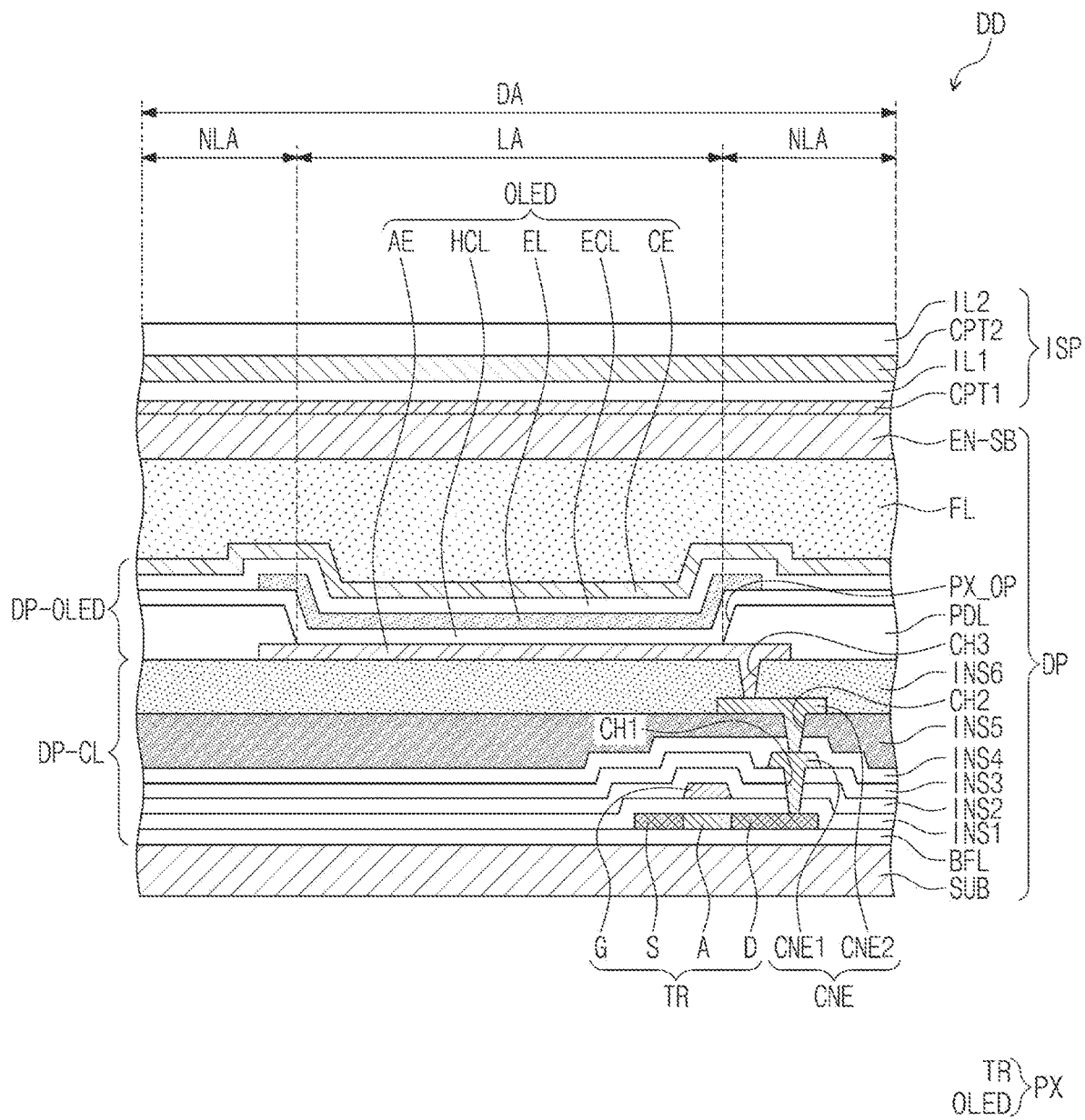
FIG. 3 is a cross-sectional view illustrating a portion of the display device according to some embodiments of the present disclosure.

FIG. 3 is a cross-sectional view illustrating a portion of the display device DD according to some embodiments of the present disclosure. In FIG. 3, the display panel DP and the input sensing panel ISP are illustrated.

Referring to FIG. 3, the display panel DP may include a substrate SUB, a circuit element layer DP-CL, a display element layer DP-OLED, a filler FL, and an encapsulation substrate EN-SB.

The substrate SUB may include a display region DA and a non-display region NDA (e.g., refer to FIG. 1) around the display region DA. The circuit element layer DP-CL may be disposed on (e.g., positioned/located or arranged on) the substrate SUB. The display element layer DP-OLED may be disposed on the circuit element layer DP-CL. The pixels PX may be disposed at the circuit element layer DP-CL and the display element layer DP-OLED. Each of the pixels PX may include a transistor TR disposed at (e.g., positioned/located or arranged at) the circuit element layer DP-CL and a light emitting element OLED disposed at the display element layer DP-OLED and connected to the transistor TR.

The circuit element layer DP-CL may include a buffer layer BFL, the transistor TR, first to sixth insulating layers INS1, INS2, INS3, INS4, INS5, and INS6, and connecting electrodes CNE.

The buffer layer BFL may be disposed on the substrate SUB. The buffer layer BFL may be an inorganic layer. A semiconductor pattern may be disposed on the buffer layer BFL. The semiconductor pattern may include poly silicon, amorphous silicon, or metal oxide.

The semiconductor pattern may be doped with an N-type dopant or a P-type dopant. The semiconductor pattern may include a heavily doped region and a lightly doped region. The heavily doped region may have a higher conductivity than the lightly doped region and may substantially serve as a source electrode and a drain electrode of the transistor TR. The lightly doped region may substantially correspond to an active (e.g., channel) region of the transistor.

The transistor TR may be disposed on the buffer layer BFL. A source region S, an active region A, and a drain region D of the transistor TR may be formed from the semiconductor pattern. The first insulating layer INS1 may be disposed on the semiconductor pattern and may cover the semiconductor pattern. A gate electrode G of the transistor TR may be disposed on the first insulating layer INS1. The second insulating layer INS2 may be disposed on the gate electrode G and may cover the gate electrode G. The third insulating layer INS3 may be disposed on the second insulating layer INS2. Although one transistor TR is illustrated as an example in FIG. 3, the pixel PX may include a plurality of transistors and at least one capacitor for driving the light emitting element OLED.

The connecting electrodes CNE may include a first connecting electrode CNE1 and a second connecting electrode CNE2 for connecting the transistor TR and the light emitting element OLED. The first connecting electrode CNE1 may be disposed on the third insulating layer INS3 and may be connected to the drain D through a first contact hole CH1 defined in the first to third insulating layers INS1 to INS3.

The fourth insulating layer INS4 may be disposed on the first connecting electrode CNE1 and may at least partially cover the first connecting electrode CNE1. The fifth insulating layer INS5 may be disposed on the fourth insulating layer INS4. The second connecting electrode CNE2 may be disposed on the fifth insulating layer INS5. The second connecting electrode CNE2 may be connected to the first connecting electrode CNE1 through a second contact hole CH2 defined in the fourth and fifth insulating layers INS4 and INS5. The sixth insulating layer INS6 may be disposed on the second connecting electrode CNE2 and may cover the second connecting electrode CNE2.

The layers from the buffer layer BFL to the sixth insulating layer INS6 may be defined as the circuit element layer DP-CL. The first to sixth insulating layers INS1 to INS6 may be inorganic layers or organic layers.

The display element layer DP-OLED may include a pixel defining layer PDL and the light emitting element OLED. The light emitting element OLED may include a first electrode AE (e.g., an anode), a hole control layer HCL, an emissive layer EL, an electron control layer ECL, and a second electrode CE (e.g., a cathode). The light emitting element OLED may be disposed in an emissive region LA.

The display region DA may include the emissive region LA corresponding to each of the pixels PX and a non-emissive region NLA around the emissive region LA. The light emitting element OLED may be disposed in the emissive region LA.

The first electrode AE may be disposed on the sixth insulating layer INS6. The first electrode AE may be connected to the second connecting electrode CNE2 through a third contact hole CH3 defined in the sixth insulating layer INS6. The pixel defining layer PDL having an opening PX_OP defined therein for exposing portion (e.g., a set or predetermined portion) of the first electrode AE may be disposed on the first electrode AE and the sixth insulating layer INS6.

The hole control layer HCL may be disposed on the first electrode AE and the pixel defining layer PDL. The hole control layer HCL may include a hole transport layer and a hole injection layer.

The emissive layer EL may be disposed on the hole control layer HCL. The emissive layer EL may be disposed in a region corresponding to the opening PX_OP. The emissive layer EL may include an organic material and/or an inorganic material. The emissive layer EL may generate any one of red light, green light, or blue light.

The electron control layer ECL may be disposed on the emissive layer EL and the hole control layer HCL. The electron control layer ECL may include an electron transport layer and an electron injection layer. The hole control layer HCL and the electron control layer ECL may be commonly disposed in the emissive region LA and the non-emissive region NLA.

The second electrode CE may be disposed on the electron control layer ECL. The second electrode CE may be a common electrode shared by the pixels PX. For example, the second electrode CE may be disposed as a common electrode in the entire display region DA.

A first voltage may be applied to the first electrode AE through the transistor TR, and a second voltage may be applied to the second electrode CE. Holes and electrons injected into the emissive layer EL may be combined to form excitons, and the light emitting element OLED may emit light as the excitons transition to a ground state.

The encapsulation substrate EN-SB may be disposed on the display element layer DP-OLED. A sealing layer SAL (e.g., refer to FIG. 6) may be disposed between the substrate SUB and the encapsulation substrate EN-SB. The filler FL may be disposed between the substrate SUB and the encapsulation substrate EN-SB. The filler FL may be disposed in a space between the substrate SUB and the encapsulation substrate EN-SB that is sealed by the sealing layer SAL. The filler FL may include a thermosetting material. The filler FL may be disposed on the second electrode CE and may cover the pixel PX.

The input sensing panel ISP may be disposed on the display panel DP. The input sensing panel ISP may include a base substrate EN-SB, a first conductive layer CPT1, a first sensing insulation layer IL1, a second conductive layer CPT2, and a second sensing insulation layer IL2. The base substrate EN-SB may be the encapsulation substrate EN-SB of the display panel DP. That is, the input sensing panel ISP and the display panel DP may share one common substrate. In some embodiments of the present disclosure, the base substrate of the input sensing panel ISP and the encapsulation substrate EN-SB of the display panel DP may be attached (e.g., adhered) to each other by an adhesive layer.

The first conductive layer CPT1 may be disposed on the encapsulation substrate EN-SB. The first conductive layer CPT1 may include a plurality of sensing parts SP1 (e.g., refer to FIG. 4), a plurality of sensing patterns SP2 (e.g., refer to FIG. 4), and connecting parts CP (e.g., refer to FIG. 4). The first conductive layer CPT1 may include a transparent conductive material. For example, the first conductive layer CPT1 may include conductive oxide. The first conductive layer CPT1 may include transparent conductive oxide such as indium tin oxide (ITO), indium zinc oxide (IZO), zinc oxide (ZnO), indium zinc tin oxide (IZTO), and/or the like.

The first conductive layer CPT1 may overlap the emissive region LA in a plan view (e.g., when viewed on the plane). Light generated from the light emitting element OLED may be transmit through the transparent first conductive layer CPT1 and thus travel upward toward the outside.

The first sensing insulation layer IL1 may be disposed on the encapsulation substrate EN-SB and may cover the first conductive layer CPT1. The first sensing insulation layer IL1 may include an inorganic insulating layer or an organic insulating layer.

The second conductive layer CPT2 may be disposed on the first sensing insulation layer IL1. The second conductive layer CPT2 may include connecting patterns CT (e.g., refer to FIG. 4). The second conductive layer CPT2 may include a metallic material.

In some embodiments of the present disclosure, the first conductive layer CPT1 may have a single-layer structure including indium tin oxide. The second conductive layer CPT2 may have a multi-layer structure including a molybdenum-niobium alloy and an aluminum-neodymium alloy. The second conductive layer CPT2 may be thicker than the first conductive layer CPT1. For example, the first conductive layer CPT1 may have a thickness of 850 angstroms, and the second conductive layer CPT2 may have a thickness of 4500 angstroms.

The second sensing insulation layer IL2 may be disposed on the second conductive layer CPT2 and may cover the second conductive layer CPT2. The second sensing insulation layer IL2 may include an inorganic insulating layer or an organic insulating layer.

A plurality of sensing electrodes SE1 and SE2 (e.g., refer to FIG. 4) of the input sensing panel ISP may be formed by the first conductive layer CPT1 and the second conductive layer CPT2. Detailed configurations of the plurality of sensing electrodes SE1 and SE2 will be described further below.

Figure 4:
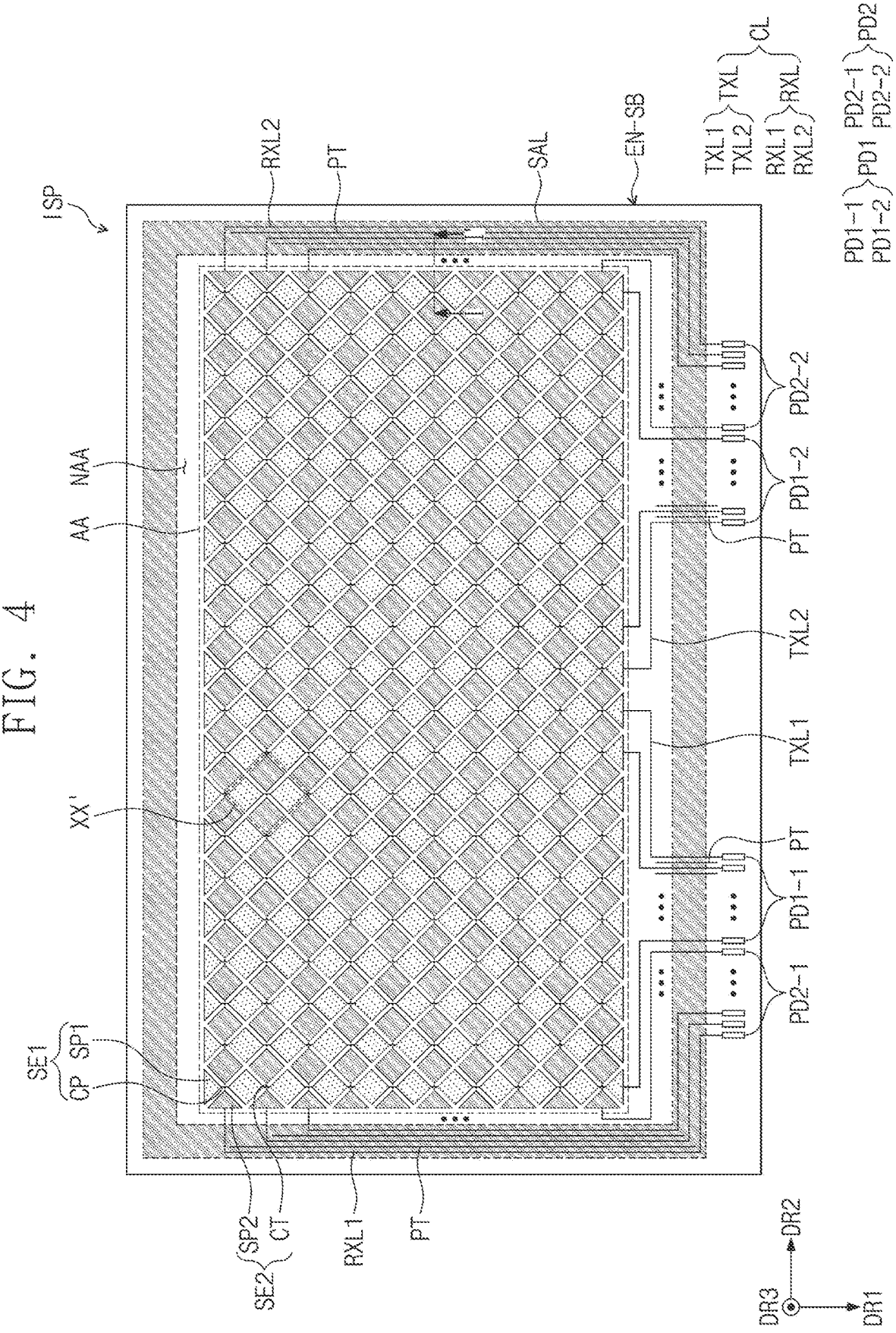
FIG. 4 is a plan view of an input sensing panel according to some embodiments of the present disclosure.

FIG. 4 is a plan view of the input sensing panel ISP according to some embodiments of the present disclosure.

Referring to FIG. 4, the input sensing panel ISP may include the plurality of sensing electrodes SE1 and SE2, a plurality of connecting lines CL, a plurality of first pads PD1, a plurality of second pads PD2, and barrier ribs PT. The plurality of sensing electrodes SE1 and SE2, the plurality of connecting lines CL, the plurality of first pads PD1, and the plurality of second pads PD2 may be disposed on the encapsulation substrate EN-SB.

A planar region of the input sensing panel ISP, in a plan view (e.g., when viewed on the plane), may include an active region AA and an inactive region NAA adjacent to the active region AA. The inactive region NAA may surround (e.g., surround all sides of) the active region AA. In a plan view (e.g., when viewed on the plane), the active region AA may overlap the display region DA (e.g., refer to FIG. 1), and the inactive region NAA may overlap the non-display region NDA (e.g., refer to FIG. 1).

The plurality of sensing electrodes SE1 and SE2 may be disposed in the active region AA. The plurality of sensing electrodes SE1 and SE2 may include the plurality of first sensing electrodes SE1 and the plurality of second sensing electrodes SE2. The plurality of first sensing electrodes SE1 may extend in the first direction DR1 and columns of first sensing electrodes SE1 may be arranged and spaced apart from one another in the second direction DR2. The plurality of second sensing electrodes SE2 may extend in the second direction DR2 and rows of the second sensing electrodes SE2 may be arranged and spaced apart from one another in the first direction DR1. The plurality of first sensing electrodes SE1 and the plurality of second sensing electrodes SE2 may extend to insulatively cross each other (e.g., intersect each other). That is, the plurality of first sensing electrodes SE1 may be insulated from the plurality of second sensing electrodes SE2.

Each of the plurality of first sensing electrodes SE1 may include the plurality of sensing parts SP1 arranged in the first direction DR1 and the connecting parts CP electrically connected to the plurality of sensing parts SP1. The plurality of sensing parts SP1 and the connecting parts CP may be integrally formed (e.g., so as to make up and work together as a single complete piece or unit). Each of the connecting parts CP may be disposed between two sensing parts SP1 adjacent to each other in the first direction DR1 and may electrically connect the two sensing parts SP1.

Each of the plurality of second sensing electrodes SE2 may include the plurality of sensing patterns SP2 arranged in the second direction DR2 and the connecting patterns CT electrically connected to the plurality of sensing patterns SP2. Each of the connecting patterns CT may be disposed between two sensing patterns SP2 that are adjacent to each other in the second direction DR2 and may electrically connect the two sensing patterns SP2. The plurality of first sensing electrodes SE1 and the plurality of second sensing electrodes SE2 will be described below in detail with reference to FIGS. 5 and 6.

The plurality of connecting lines CL may extend in the first direction DR1 and may be spaced apart from each other in the second direction DR2. The plurality of connecting lines CL may be electrically connected to the first conductive layer CPT1 (e.g., refer to FIG. 3).

The plurality of connecting lines CL may include a plurality of first connecting lines TXL connected to the plurality of first sensing electrodes SE1 and a plurality of second connecting lines RXL connected to the plurality of second sensing electrodes SE2. A drive signal may be applied to the plurality of first sensing electrodes SE1 through the plurality of first connecting lines TXL, and a change in capacitance formed between the plurality of first and second sensing electrodes SE1 and SE2, which may be result from an input using a user's body (e.g., a finger OI) or an input using an input device PE, may be output as a sensing signal through the plurality of second connecting lines RXL.

First ends of the plurality of first connecting lines TXL may be connected to first ends of the plurality of first sensing electrodes SE1. The plurality of first connecting lines TXL may extend to the lower inactive region NAA, and second ends of the plurality of first connecting lines TXL may be connected to the plurality of first pads PD1.

The plurality of first connecting lines TXL may include a plurality of first transmitting lines TXL1 and a plurality of second transmitting lines TXL2. The plurality of first transmitting lines TXL1 may be connected to the plurality of first sensing electrodes SE1 and a plurality of 1-1 pads PD1-1 disposed on the left side with respect to the center of the active region AA. The plurality of second transmitting lines TXL2 may be connected to the plurality of first sensing electrodes SE1 and a plurality of 1-2 pads PD1-2 disposed on the right side with respect to the center of the active region AA, when viewed in a plan view.

First ends of the plurality of second connecting lines RXL may be connected to first and second ends of the plurality of second sensing electrodes SE2. The first and second ends of the plurality of second sensing electrodes SE2 may be spaced apart from each other in the second direction DR2. The plurality of second connecting lines RXL may extend to the inactive region NAA, and second ends of the plurality of second connecting lines RXL may be connected to the plurality of second pads PD2.

The plurality of second connecting lines RXL may include a plurality of first receiving lines RXL1 and a plurality of second receiving lines RXL2. When viewed in a plan view, the plurality of first receiving lines RXL1 may be disposed in the inactive region NAA adjacent to the left side of the active region AA (hereinafter, referred to as the left inactive region) and may be connected to the first ends of the plurality of second sensing electrodes SE2 adjacent to the left inactive region NAA and a plurality of 2-1 2-1 pads PD2-1. When viewed in a plan view, the plurality of second receiving lines RXL2 may be disposed in the inactive region NAA adjacent to the right side of the active region AA (hereinafter, referred to as the right inactive region) and may be connected to the first ends of the plurality of second sensing electrodes SE2 adjacent to the right inactive region NAA and a plurality of 2-2 pads PD2-2.

Although the plurality of first and second transmitting lines TXL1 and TXL2 connected to the plurality of sensing parts SP1 and the plurality of first and second receiving lines RXL1 and RXL2 connected to the plurality of sensing patterns SP2 are illustrated as an example in FIG. 4, embodiments of the present disclosure are not limited thereto. For example, connecting lines connected to the plurality of sensing parts SP1 may be receiving lines, and connecting lines connected to the plurality of sensing patterns SP2 may be transmitting lines.

The plurality of first pads PD1 and the plurality of second pads PD2 may be disposed in the inactive region NAA. For example, the plurality of first pads PD1 and the plurality of second pads PD2 may be disposed in the inactive region NAA adjacent to the lower side of the active region AA, when viewed in a plan view (hereinafter, referred to as the lower inactive region). The plurality of first pads PD1 and the plurality of second pads PD2 may be disposed on the left side and the right side with respect to the center of the lower inactive region NAA, when viewed in a plan view.

The plurality of first pads PD1 may include the plurality of 1-1 pads PD1-1 and the plurality of 1-2 pads PD1-2. The plurality of second pads PD2 may include the plurality of 2-1 pads PD2-1 and the plurality of 2-2 pads PD2-2.

The plurality of 1-1 pads PD1-1 and the plurality of 2-1 pads PD2-1 may be disposed on the left side with respect to the center of the lower inactive region NAA. The plurality of 1-2 pads PD1-2 and the plurality of 2-2 pads PD2-2 may be disposed on the right side with respect to the center of the lower inactive region NAA, when viewed in a plan view.

In the lower inactive region NAA, the plurality of 2-1 pads PD2-1 may be disposed outward of the plurality of 1-1 pads PD1-1, and the plurality of 2-2 pads PD2-2 may be disposed outward of the plurality of 1-2 pads PD1-2. That is, the plurality of 2-1 pads PD2-1 may be spaced apart from the plurality of 1-1 pads PD1-1 in the direction opposite to the second direction DR2 (e.g., in the −DR2 direction), and the plurality of 2-2 pads PD2-2 may be spaced apart from the plurality of 1-2 pads PD1-2 in the second direction DR2.

The barrier ribs PT may include an insulating material. The barrier ribs PT may extend in the first direction DR1 in the inactive region NAA. The barrier ribs PT may be disposed between the plurality of connecting lines CL. For example, the barrier ribs PT may be arranged to alternate with the plurality of connecting lines CL in the second direction DR2. For example, the barrier ribs PT may be disposed between the plurality of first receiving lines RXL1, between the plurality of second receiving lines RXL2, between the plurality of first transmitting lines TXL1, and between the plurality of second transmitting lines TXL2.

The second conductive layer CPT2 may be implemented with a plurality of layers and may be thicker than the first conductive layer CPT1. Accordingly, for implementation of low-resistance characteristics, the plurality of connecting lines CL may be included in the second conductive layer CPT2. In the case in which the barrier ribs PT are disposed between the plurality of connecting lines CL, scratch resistance may be increased in a scratch test. For example, a situation in which the plurality of connecting lines CL are pushed or brought into contact with each other when a scratch occurs may be reduced or eliminated. Thus, the product reliability of the input sensing panel ISP may be improved (e.g., increased).

The sealing layer SAL may be provided to couple the encapsulation substrate EN-SB to a portion of the display panel DP (e.g., refer to FIG. 3). The sealing layer SAL may be disposed to overlap the inactive region NAA and may be disposed to surround the active region AA in a plan view. In the lower inactive region NAA, the sealing layer SAL may be disposed closer to the active region AA than the first and second pads PD1 and PD2. Some of the plurality of first receiving lines RXL1, some of the plurality of second receiving lines RXL2, and some of the barrier ribs PT may be disposed to overlap the sealing layer SAL.

Figure 5:
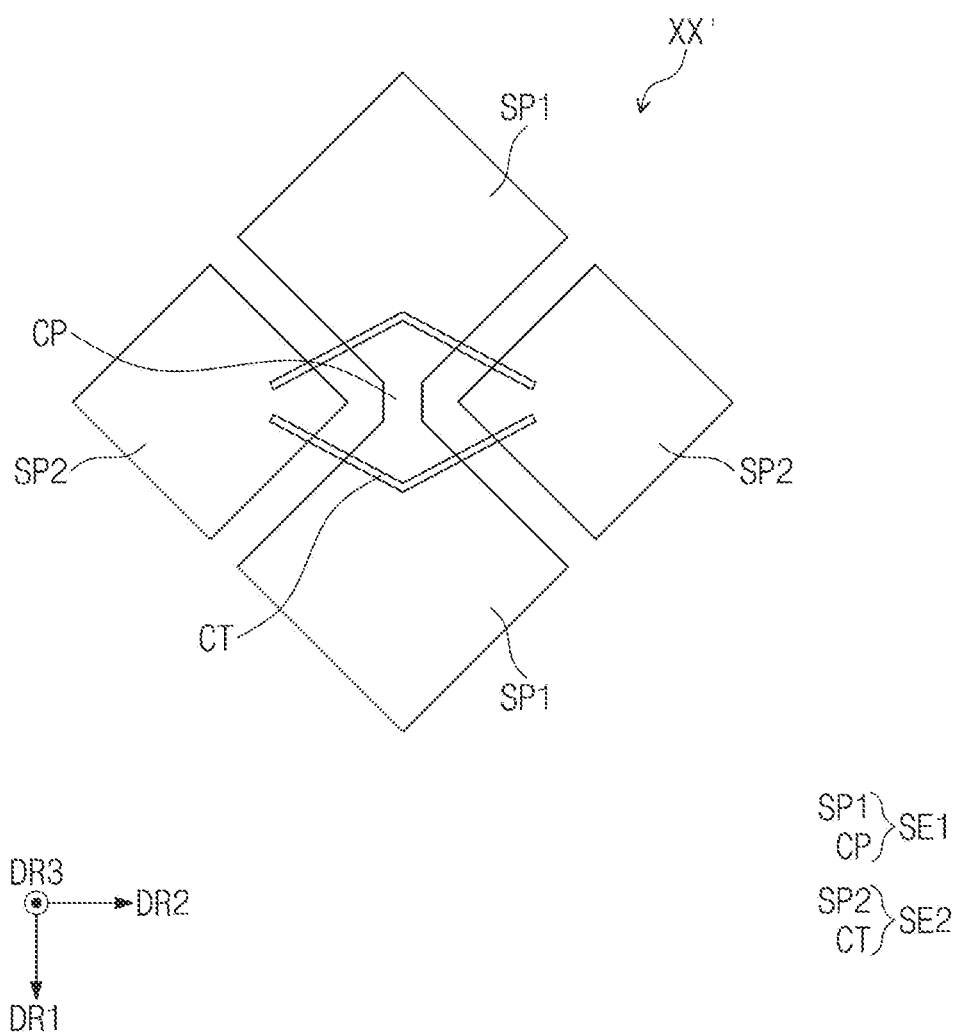
FIG. 5 is an enlarged view of a region corresponding to the region XX' of FIG. 4.
Figure 6:
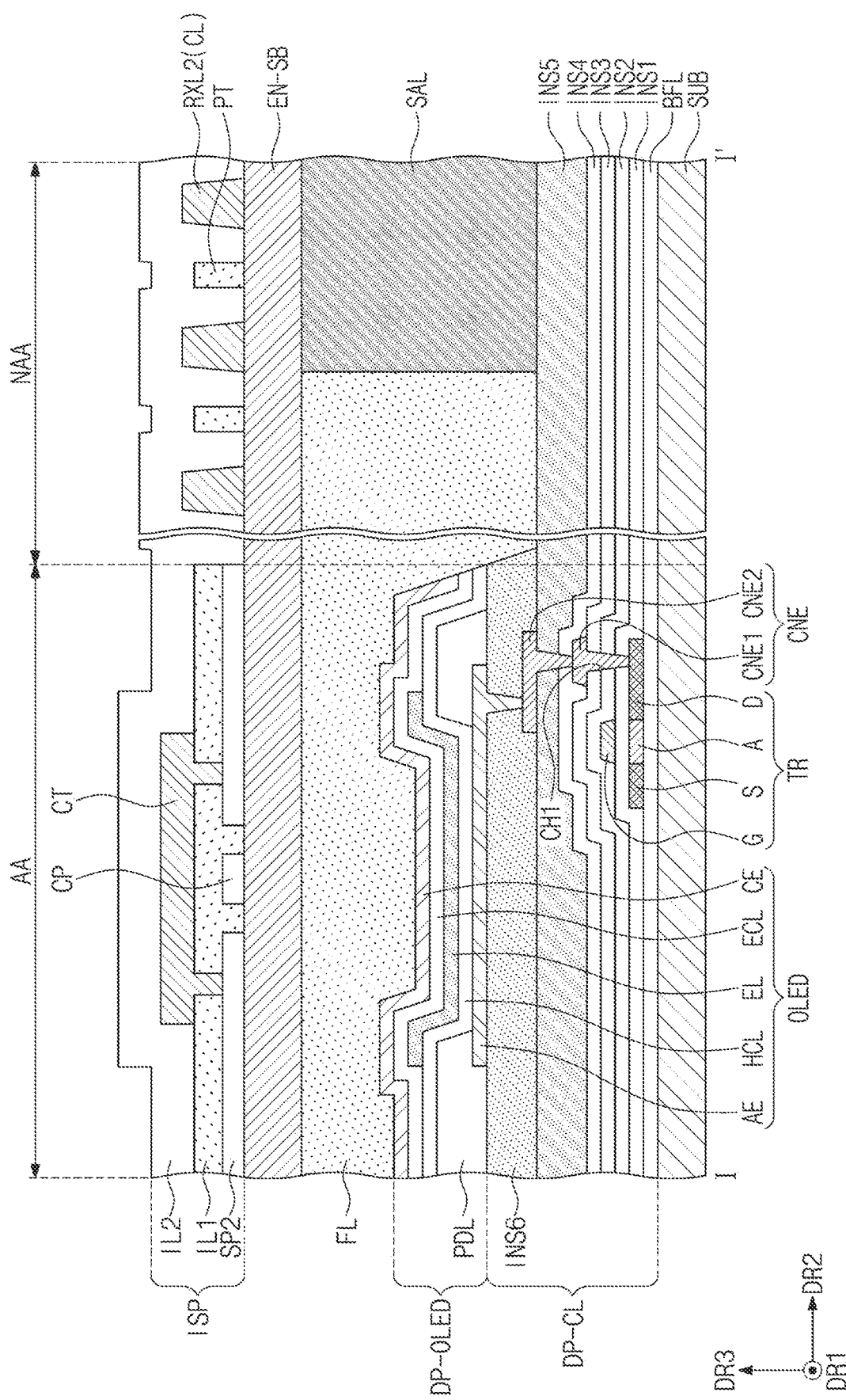
FIG. 6 is a cross-sectional view taken along the line I-I' of FIG. 4.

FIG. 5 is an enlarged view of a region corresponding to the region XX' of FIG. 4. FIG. 6 is a cross-sectional view taken along the line I-I' of FIG. 4. FIG. 5 illustrates two sensing parts SP1 adjacent to each other and two sensing patterns SP2 adjacent to each other. In describing FIGS. 5 and 6, repetitive descriptions that are the same or substantially the same as that provided above with reference to FIGS. 3 and 4 will be omitted.

Referring to FIGS. 5 and 6, a first sensing electrode SE1 may include a pair of sensing parts SP1 arranged in the first direction DR1 and a connecting part CP extending from the sensing parts SP1. That is, the sensing parts SP1 and the connecting part CP may be integrally formed (e.g., so as to make up and work together as a single complete piece or unit).

A second sensing electrode SE2 may include a pair of sensing patterns SP2 arranged in the second direction DR2 and a connecting pattern CT disposed between the sensing patterns SP2. The connecting pattern CT may electrically connect the sensing patterns SP2. For example, the connecting pattern CT of the second sensing electrode SE2 may be disposed on the first sensing insulation layer IL1 and may be connected with the sensing pattern SP2 of the second sensing electrode SE2 through a contact hole defined in the first sensing insulation layer IL1.

The plurality of first sensing electrodes SE1 and the plurality of sensing patterns SP2 may be directly disposed on the encapsulation substrate EN-SB (e.g., the base substrate). The plurality of sensing parts SP1 and the plurality of sensing patterns SP2 may be spaced apart from each other without overlapping each other. The plurality of sensing parts SP1, the plurality of sensing patterns SP2, and the connecting parts CP may be disposed at the same layer, and the connecting patterns CT may be disposed at a layer different from the layer in which the plurality of sensing parts SP1, the plurality of sensing patterns SP2, and the connecting parts CP are disposed. Accordingly, the connecting parts CP of the first sensing electrodes SE1 and the connecting patterns CT of the second sensing electrodes SE2 may be insulated from each other and may extend to intersect each other in a plan view.

Referring to FIG. 6, the sealing layer SAL may be disposed on the inactive region NAA. The sealing layer SAL may bond the substrate SUB and the encapsulation substrate EN-SB to each other. The display element layer DP-OLED may be sealed between the substrate SUB and the encapsulation substrate EN-SB by the sealing layer SAL. The sealing layer SAL may include a photocurable material.

The plurality of connecting lines CL may be directly disposed on the encapsulation substrate EN-SB (e.g., the base substrate). In the inactive region NAA, the barrier ribs PT may be disposed between the plurality of connecting lines CL. The barrier ribs PT may include the same or substantially the same material as the first sensing insulation layer IL1 and may be formed through the same or substantially the same process. For example, the first sensing insulation layer IL1 disposed in the active region AA and the barrier ribs PT disposed in the inactive region NAA may be formed by a photolithography process after an insulating layer is formed. Thereafter, the plurality of connecting lines CL may be formed in regions not overlapping the barrier ribs PT. The barrier ribs PT may have a smaller thickness than the plurality of connecting lines CL.

Although the plurality of second receiving lines RXL2 are illustrated as an example in FIG. 6, embodiments of the present disclosure are not limited thereto, and the barrier ribs PT may be disposed between the plurality of first receiving lines RXL1, between the plurality of second receiving lines RXL2, between the plurality of first transmitting lines TXL1, and between the plurality of second transmitting lines TXL2.

The connecting patterns CT and the plurality of connecting lines CL may include the same or substantially the same material and may be formed through the same or substantially the same process. For example, when the plurality of connecting lines CL are subjected to (e.g., formed through) patterning, the connecting patterns CT may also be subjected to (e.g., formed through) patterning together. The second sensing insulation layer IL2 may cover the barrier ribs PT, the plurality of connecting lines CL, and the second conductive layer CPT2 (e.g., refer to FIG. 4) including the connecting patterns CT.

Figure 7:
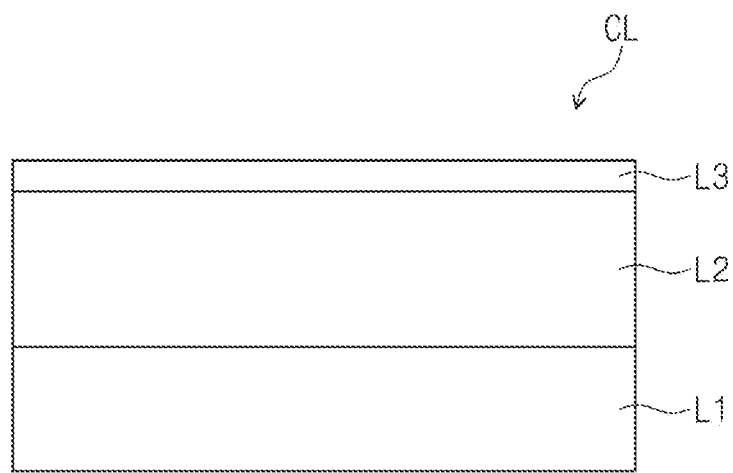
FIG. 7 is a sectional view of each of a plurality of connecting lines according to some embodiment of the present disclosure.

FIG. 7 is a cross-sectional view of each of the plurality of connecting lines CL according to some embodiments of the present disclosure.

Referring to FIG. 7, each of the plurality of connecting lines CL may include a first layer L1, a second layer L2 disposed on the first layer L1, and a third layer L3 disposed on the second layer L2. The first layer L1 and the third layer L3 may include a first material, and the second layer L2 may include a second material different from the first material. For example, the first material may be a molybdenum-niobium alloy MoNb, and the second material may be an aluminum-neodymium alloy AlNd. However, this is illustrative, and embodiments of the present disclosure are not limited thereto.

The second layer L2 may be thicker than the first layer L1 and the third layer L3, and the first layer L1 may be thicker than the third layer L3. For example, the first layer L1 may have a thickness of about 1500 angstroms, the second layer L2 may have a thickness of about 2600 angstroms, and the third layer L3 may have a thickness of about 400 angstroms. However, this is illustrative, and embodiments of the present disclosure are not limited thereto.

Although the structure of the plurality of connecting lines CL is illustrated as an example in FIG. 7, the plurality of connecting lines CL may include the same or substantially the same material as the connecting patterns CT. Accordingly, the connecting patterns CT may also include the three-layer structure illustrated in FIG. 7, in some examples.

The second conductive layer CPT2 (e.g., refer to FIG. 3) may be implemented with a plurality of layers and may be thicker than the first conductive layer CPT1 (e.g., refer to FIG. 3). Accordingly, for implementation of low-resistance characteristics, the plurality of connecting lines CL may be included in the second conductive layer CPT2. In the case in which the barrier ribs PT (e.g., refer to FIG. 6) are disposed between the plurality of connecting lines CL, scratch resistance may be increased in a scratch test. For example, a situation in which the plurality of connecting lines CL are pushed or brought into contact with each other when a scratch occurs may be reduced or eliminated. Thus, the product reliability of the input sensing panel ISP (e.g., refer to FIG. 6) may be improved (e.g., increased).

As described above, the second conductive layer may be implemented with a plurality of layers and may be thicker than the first conductive layer. Accordingly, for implementation of low-resistance characteristics, the plurality of connecting lines may be included in the second conductive layer. In the case in which the barrier ribs are disposed between the plurality of connecting lines, scratch resistance may be increased in a scratch test. For example, a situation in which the plurality of connecting lines are pushed or brought into contact with each other when a scratch occurs may be reduced or eliminated. Thus, the product reliability of the input sensing panel may be improved (e.g., increased).

While the present disclosure has been described with reference to embodiments thereof, it will be apparent to those of ordinary skill in the art that various changes and modifications may be made thereto without departing from the spirit and scope of the present disclosure as set forth in the following claims and equivalents thereof.

What is claimed is:

1. A display device comprising:
   a display panel; and
   an input sensing panel on the display panel, the input sensing panel comprising an active region and an inactive region adjacent to the active region, the input sensing panel comprising:
   a base substrate;
   a first conductive layer on the base substrate, the first conductive layer comprising a plurality of sensing parts, a connecting part electrically connected to the plurality of sensing parts, and a plurality of sensing patterns;
   a first sensing insulation layer in the active region and configured to cover the first conductive layer;
   a plurality of connecting lines in the inactive region and electrically connected to the first conductive layer; and
   barrier ribs in the inactive region and between the plurality of connecting lines.

2. The display device of claim 1, wherein the first sensing insulation layer and the barrier ribs comprise the same material.

3. The display device of claim 1, wherein the input sensing panel further comprises a second conductive layer on the first sensing insulation layer and comprising a connecting pattern electrically connected to the plurality of sensing patterns.

4. The display device of claim 3, wherein the first conductive layer comprises conductive oxide, and the second conductive layer comprises a metallic material.

5. The display device of claim 3, wherein the input sensing panel further comprises a second sensing insulation layer configured to cover the second conductive layer, the barrier ribs, and the plurality of connecting lines.

6. The display device of claim 1, wherein the plurality of connecting lines extend in a first direction and are spaced apart from each other in a second direction crossing the first direction, and
   wherein the barrier ribs extend in the first direction and are positioned to alternate with the plurality of connecting lines in the second direction.

7. The display device of claim 1, wherein a thickness of a barrier rib of the barrier ribs is smaller than a thickness of a connecting line of the plurality of connecting lines.

8. The display device of claim 1, wherein each of the plurality of connecting lines comprises:
   a first layer comprising a first material;
   a second layer on the first layer and comprising a second material different from the first material; and
   a third layer on the second layer and comprising the first material.

9. The display device of claim 8, wherein the second layer is thicker than the first layer and the third layer.

10. The display device of claim 1, wherein the display panel comprises:
a substrate;
a circuit element layer on the substrate;
a display element layer on the circuit element layer; and
an encapsulation substrate configured to cover the display element layer, the encapsulation substrate being the base substrate.

11. A display device comprising:
a base substrate;
a plurality of sensing electrodes on the base substrate;
a plurality of connecting lines electrically connected to the plurality of sensing electrodes; and
barrier ribs between the plurality of connecting lines and arranged to alternate with the plurality of connecting lines,
wherein the barrier ribs comprise an insulating material.

12. The display device of claim 11, wherein the plurality of sensing electrodes comprise:
a plurality of first sensing electrodes, each of which comprises a plurality of sensing parts and a connecting part electrically connected to the plurality of sensing parts; and
a plurality of second sensing electrodes, each of which comprises a plurality of sensing patterns and a connecting pattern electrically connected to the plurality of sensing patterns.

13. The display device of claim 12, wherein the plurality of first sensing electrodes and the plurality of sensing patterns are directly on the base substrate.

14. The display device of claim 12, further comprising:
a first sensing insulation layer on the base substrate and configured to cover the plurality of first sensing electrodes and the plurality of sensing patterns.

15. The display device of claim 14, wherein the first sensing insulation layer comprises the same material as the barrier ribs.

16. The display device of claim 14, wherein the connecting pattern is on the first sensing insulation layer.

17. The display device of claim 14, further comprising:
a second sensing insulation layer configured to cover the connecting pattern, the barrier ribs, and the plurality of connecting lines.

18. The display device of claim 11, wherein a thickness of the barrier ribs is smaller than a thickness of the plurality of connecting lines.

19. The display device of claim 11, wherein each of the plurality of connecting lines comprises:
a first layer comprising a first material;
a second layer on the first layer and comprising a second material different from the first material; and
a third layer on the second layer and comprising the first material.

20. The display device of claim 19, wherein the second layer is thicker than the first layer and the third layer.

* * * * *